United States Patent
Wang

(10) Patent No.: US 9,038,682 B2
(45) Date of Patent: May 26, 2015

(54) PNEUMATIC TIRE

(75) Inventor: Daqian Wang, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/238,188

(22) PCT Filed: Aug. 10, 2011

(86) PCT No.: PCT/JP2011/068329
§ 371 (c)(1),
(2), (4) Date: May 15, 2014

(87) PCT Pub. No.: WO2013/021499
PCT Pub. Date: Feb. 14, 2013

(65) Prior Publication Data
US 2014/0345766 A1    Nov. 27, 2014

(51) Int. Cl.
*B60C 11/13*     (2006.01)
*B60C 9/22*      (2006.01)
*B60C 11/04*     (2006.01)
(Continued)

(52) U.S. Cl.
CPC ........... *B60C 11/1353* (2013.04); *B60C 9/2006* (2013.04); *B60C 2011/0341* (2013.04); *B60C 11/1323* (2013.04); *B60C 9/28* (2013.01); *B60C 11/1307* (2013.04); *B60C 2009/2257* (2013.04); *B60C 2009/2266* (2013.04); *B60C 11/042* (2013.04); *B60C 9/0007* (2013.04); *B60C 2009/0085* (2013.04)

(58) Field of Classification Search
CPC ........ B60C 2200/04; B60C 9/04; B60C 9/18; B60C 9/20; B60C 9/22; B60C 9/2204; B60C 9/2219; B60C 9/2223; B60C 9/2252; B60C 2001/0066; B60C 11/0008; B60C 2011/0341; B60C 2011/0344; B60C 2011/0353; B60C 2011/0355; B60C 2011/0386; B60C 2011/0388; B60C 2011/039; B60C 11/04; B60C 11/042; B60C 11/13; B60C 11/1307; B60C 11/1315; B60C 11/1323; B60C 11/1353
USPC .............. 152/526, 531, 209.1, 209.3, 209.18, 152/209.23, 209.24, 900, 901
See application file for complete search history.

(56) References Cited

U.S. PATENT DOCUMENTS 3,949,797 A  *  4/1976  Mirtain et al. ........... 152/209.14
4,840,210 A  *  6/1989  Kukimoto ................. 152/209.9
(Continued)

FOREIGN PATENT DOCUMENTS

JP       5-185808      *  7/1993
JP       H05-185808       7/1993
(Continued)

OTHER PUBLICATIONS

International Search Report dated Nov. 15, 2011, 3 pages, Japan.

*Primary Examiner* — Eric Hug
(74) *Attorney, Agent, or Firm* — Thorpe North & Western

(57) ABSTRACT

The pneumatic tire 1 includes a belt layer 14 that includes a circumferential reinforcing layer 145 and a pair of cross belts 142, 143. Also, the pneumatic tire 1 includes at least three or more circumferential main grooves 21 to 23 in the tread portion having groove bottoms that are convex in the groove depth direction. Also, the curvature radius RA of the groove bottom of an arbitrary first circumferential main groove 21, 22 and the curvature radius RB of the groove bottom of an arbitrary second circumferential main groove 23 have the relationship RA<RB.

18 Claims, 12 Drawing Sheets

(51) Int. Cl.
   *B60C 9/20*    (2006.01)
   *B60C 9/28*    (2006.01)
   *B60C 9/00*    (2006.01)

(56) References Cited

U.S. PATENT DOCUMENTS

| | | | |
|---|---|---|---|
| 4,905,748 A * | 3/1990 | Kukimoto et al. | 152/209.5 |
| 4,934,430 A * | 6/1990 | Koseki et al. | 152/538 |
| 5,178,704 A * | 1/1993 | Hanada et al. | 156/117 |
| 5,240,057 A * | 8/1993 | Watanabe | 152/531 |
| 5,547,005 A * | 8/1996 | Ueyoko et al. | 152/209.25 |
| 6,079,463 A * | 6/2000 | Minami et al. | 152/209.14 |
| 6,564,841 B2 * | 5/2003 | Tozawa et al. | 152/209.21 |
| 7,165,588 B2 * | 1/2007 | Yoshinaka | 152/527 |
| 7,168,470 B2 * | 1/2007 | Yukawa et al. | 152/531 |
| 7,669,624 B2 * | 3/2010 | Yagita | 152/209.24 |
| 7,823,615 B2 * | 11/2010 | Suzuki | 152/526 |
| 8,783,315 B2 * | 7/2014 | Matsumoto | 152/528 |
| 2001/0008158 A1 * | 7/2001 | Kojima et al. | 152/531 |
| 2004/0079460 A1 | 4/2004 | Maruoka et al. | |
| 2008/0105347 A1 * | 5/2008 | Matsunaga et al. | 152/209.14 |
| 2008/0121326 A1 * | 5/2008 | Ohara | 152/209.24 |

FOREIGN PATENT DOCUMENTS

| | | |
|---|---|---|
| JP | H11-123909 | 5/1999 |
| JP | 2001-253211 | 9/2001 |
| WO | WO 2010-041720 | 4/2010 |

* cited by examiner

| | Conventional Example | Comparative Example | Working Example 1 | Working Example 2 | Working Example 3 | Working Example 4 | Working Example 5 | Working Example 6 |
|---|---|---|---|---|---|---|---|---|
| Belt layer structure | FIG. 2 | FIG. 2 | FIG. 2 | FIG. 2 | FIG. 2 | FIG. 2 | FIG. 2 | FIG. 7 |
| RA mm | RA_1=2.0 RA_2=2.0 | RA_1=2.0 RA_2=2.0 | RA_1=2.0 RA_2=2.0 | RA_1=2.0 RA_2=2.0 | RA_1=2.0 RA_2=2.0 | RA_1=2.0 RA_2=2.0 | RA_1=2.0 RA_2=2.0 | 2.0 |
| RB mm | 2.0 | 1.0 | 2.2 | 2.1 | 2.8 | 3.2 | 3.6 | RB_1=2.1 RB_2=2.2 |
| RB/RA | 1.00 | 0.50 | 1.10 | 1.05 | 1.40 | 1.60 | 1.80 | RB_1/RA=1.1 RB_2/RA=1.2 |
| Difference RB_2 - RB_1 mm | - | - | - | - | - | - | - | 0.1 |
| Difference RA_2 - RA_1 mm | - | - | - | - | - | - | - | - |
| Number of crack occurrences [No.] | 5 | 10 | 1 | 3 | 0 | 0 | 1 | 1 |

FIG. 11a

| Belt layer structure | Working Example 7 | Working Example 8 | Working Example 9 | Working Example 10 | Working Example 11 | Working Example 12 | Working Example 13 |
|---|---|---|---|---|---|---|---|
| | FIG. 7 | FIG. 8 | FIG. 8 | FIG. 9 | FIG. 9 | FIG. 10 | FIG. 10 |
| RA mm | 2.0 | 2.0 | 2.0 | RA_1=2.0 RA_2=2.1 | RA_1=2.0 RA_2=2.3 | RA_1=2.0 RA_2=2.1 | RA_1=2.0 RA_2=2.3 |
| RB mm | RB_1=2.4 RB_2=2.8 | RB_1=2.1 RB_2=2.2 | RB_1=2.4 RB_2=2.8 | 2.8 | 2.8 | 2.8 | 2.8 |
| RB/RA | RB_1/RA=1.2 RB_2/RA=1.4 | RB_1/RA=1.1 RB_2/RA=1.2 | RB_1/RA=1.2 RB_2/RA=1.4 | RB_1/RA=1.4 RB_2/RA=1.3 | RB_1/RA=1.4 RB_2/RA=1.2 | RB_1/RA=1.4 RB_2/RA=1.3 | RB_1/RA=1.4 RB_2/RA=1.2 |
| Difference RB_2 - RB_1 mm | 0.2 | 0.1 | 0.2 | - | - | - | - |
| Difference RA_2 - RA_1 mm | - | - | - | 0.1 | 0.3 | 0.1 | 0.3 |
| Number of crack occurrences [No.] | 0 | 1 | 0 | 1 | 0 | 1 | 0 |

FIG. 11b

PNEUMATIC TIRE

TECHNICAL FIELD

The present technology relates to a pneumatic tire, and more specifically, to a pneumatic tire having improved cracking resistance.

BACKGROUND

In recent years, tires have been provided with a circumferential reinforcing layer in the belt layer in order to reduce radial growth of tires. The technology described in Japanese Unexamined Patent Application Publication No. 2001-253211A is a conventional pneumatic tire that is configured in this manner. This conventional pneumatic tire is provided with protrusions in the groove bottoms of the circumferential main grooves in order to prevent damage to the groove bottoms of the circumferential main grooves, and increase the tire cracking resistance performance.

SUMMARY

The present technology provides a pneumatic tire having improved cracking resistance. The pneumatic tire according to the present technology is a pneumatic tire having a belt layer that includes a circumferential reinforcing layer and a pair of cross belts, that comprises: three or more circumferential main grooves having groove bottoms that are convex in the depth direction in a tread portion, wherein in a cross-sectional view in the tire meridian direction, of the circumferential main grooves, when a circumferential main groove having the circumferential reinforcing layer below the groove is referred to as a first circumferential main groove, and the other circumferential main grooves are referred to as second circumferential main grooves, a curvature radius RA of the groove bottom of an arbitrary first circumferential main groove and a curvature radius RB of the groove bottom of an arbitrary second circumferential main groove have the relationship RA<RB.

Also, in the pneumatic tire according to the present technology preferably the curvature radius RA of the groove bottom of an arbitrary first circumferential main groove and the curvature radius RB of the groove bottom of an arbitrary second circumferential main groove have the relationship $1.10 \leq RB/RA \leq 1.60$.

Also, in the pneumatic tire according to the present technology, when there is a plurality of second circumferential main grooves in a region bounded by the tire equatorial plane, the curvature radius RB_out of the groove bottom of the second circumferential main groove that is in the outermost side in the tire width direction and the curvature radius RB of the groove bottom of the other second circumferential main grooves have the relationship RB<RB_out.

Also, in the pneumatic tire according to the present technology, when the belt layer has a plurality of circumferential reinforcing layers laminated on each other, and when there is a plurality of first circumferential main grooves in a region bounded by the tire equatorial plane, and when at least one of the first circumferential main grooves has the plurality of circumferential reinforcing layers below the groove, preferably the curvature radius RA_min of the groove bottom of the first circumferential main groove having the smallest number of circumferential reinforcing layers below the groove from among all the first circumferential main grooves and the curvature radius RA of the groove bottom of the other first circumferential main grooves have the relationship RA<RA_min.

Also, in the pneumatic tire according to the present technology, preferably the circumferential reinforcing layer is disposed on the inner side in the tire width direction from the left and right edge portions of a cross belt with the narrower width from among the pair of cross belts, and the width W of the narrower cross belt and the distance S from the edge portion of the circumferential reinforcing layer to the edge portion of the narrower cross belt are within the range $0.03 \leq S/W$.

Also, in the pneumatic tire according to the present technology, preferably wire from which the circumferential reinforcing layer is made is steel wire, and the circumferential reinforcing layer has not fewer than 17 [ends/50 mm] and not more than 30 [ends/50 mm] ends.

Also, in the pneumatic tire according to the present technology, preferably the diameter of the wire that configures the circumferential reinforcing layer is not less than 1.2 mm and not more than 2.2 mm.

In the pneumatic tire according to the present technology, the curvature radius RA of the groove bottom of the first circumferential main grooves, which have the circumferential reinforcing layer below the grooves and the curvature radius RB of the groove bottom of the second circumferential main groove located outside the circumferential reinforcing layer have the relationship RA<Rb, so it is possible to reduce the occurrence of groove cracking in the groove bottom of the second circumferential main groove in the region where radial growth and straining can easily occur. The improvement leads to the advantage that the cracking resistance of the tire improves.

BRIEF DESCRIPTION OF THE DRAWINGS

FIGS. 11a-11b include a table showing results of performance testing of pneumatic tires according to embodiments of the present technology.

DETAILED DESCRIPTION

The present technology is described below in detail with reference to the accompanying drawing. However, the present technology is not limited to these embodiments. Moreover, constituents of the embodiment which can possibly or obviously be substituted while maintaining consistency with the present technology are included. Furthermore, the multiple modified examples described in the embodiment can be combined as desired within a scope apparent to a person skilled in the art.

Pneumatic Tire

Figure 1:
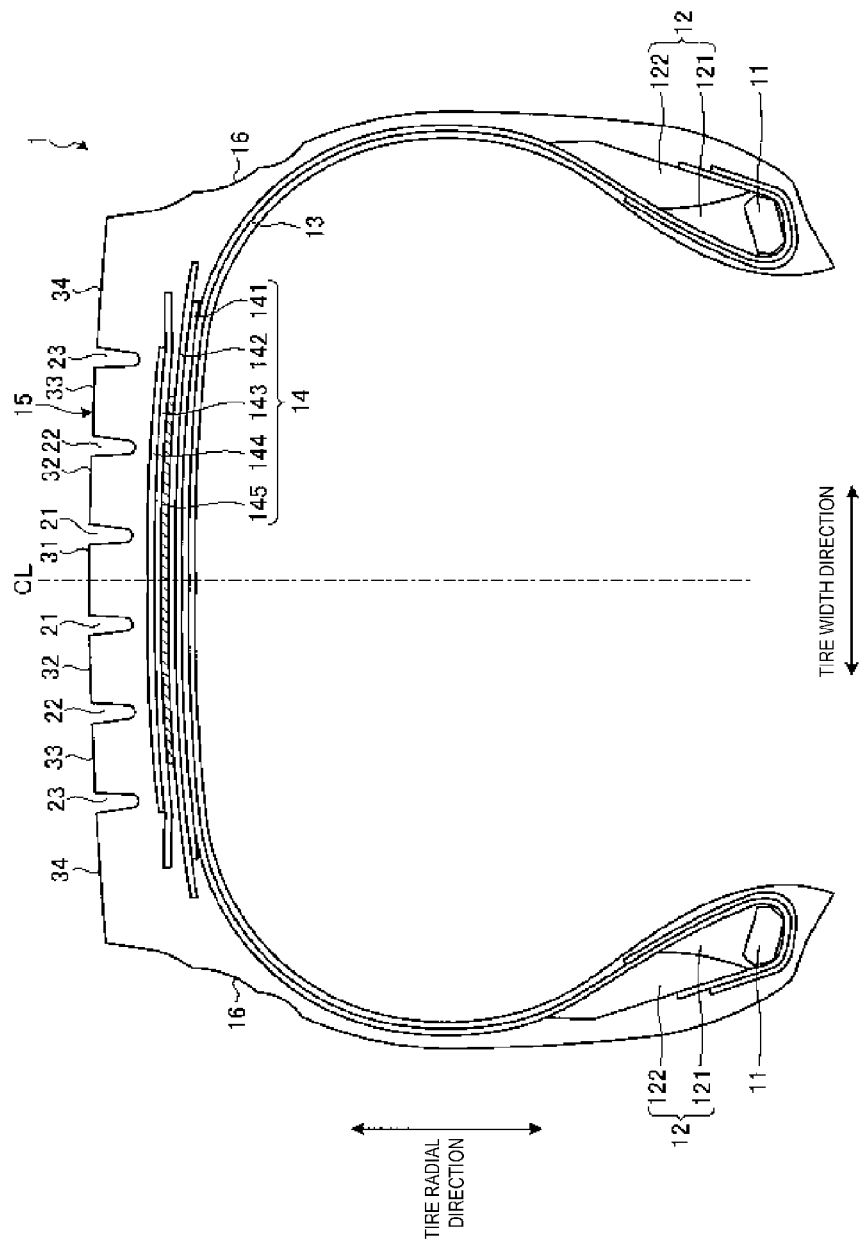
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. This drawing illustrates a radial tire for heavy loads that is fitted to the steering axles of trucks and buses for long distance transport. In this drawing, the circumferential reinforcing layer is shown hatched.

A pneumatic tire 1 includes a pair of bead cores 11,11, a pair of bead fillers 12,12, a carcass layer 13, a belt layer 14, tread rubber 15, and a pair of side wall rubbers 16,16 (see FIG. 1). The pair of bead cores 11,11 have annular structures and constitute cores of left and right bead portions. The pair of bead fillers 12,12 are formed from a lower filler 121 and an upper filler 122, and are disposed on a periphery of each of the pair of bead cores 11,11 in the tire radial direction so as to reinforce the bead portions. The carcass layer 13 has a single-layer structure, and stretches between the left and right bead cores 11 and 11 in toroidal form, forming a framework for the tire. Additionally, both ends of the carcass layer 13 are folded toward an outer side in the tire width direction so as to envelop the bead cores 11 and the bead fillers 12, and fixed. The belt layer 14 is formed from a plurality of belt plies 141 to 145 that are laminated, and the belt layer 14 is disposed on the periphery of the carcass layer 13 in the tire radial direction. The tread rubber 15 is disposed on the periphery of the carcass layer 13 and the belt layer 14 in the tire radial direction, and forms a tire tread. The pair of side wall rubbers 16,16 is disposed on each outer side of the carcass layer 13 in the tire width direction, so as to form left and right side wall portions of the tire.

Additionally, the pneumatic tire 1 includes a plurality of circumferential main grooves 21 to 23 extending in the tire circumferential direction; and a plurality of land portions 31 to 34 partitioned by the circumferential main grooves 21 to 23 in the tread portion. The circumferential main grooves 21 to 23 may be straight grooves, or they may be zigzag grooves (not illustrated on the drawings). Note that "circumferential main grooves" refers to circumferential grooves having a groove width of 5 mm or greater.

In this embodiment, a pneumatic tire 1 has a symmetric structure to the left and right of the tire equatorial plane CL as center.

Figure 2:
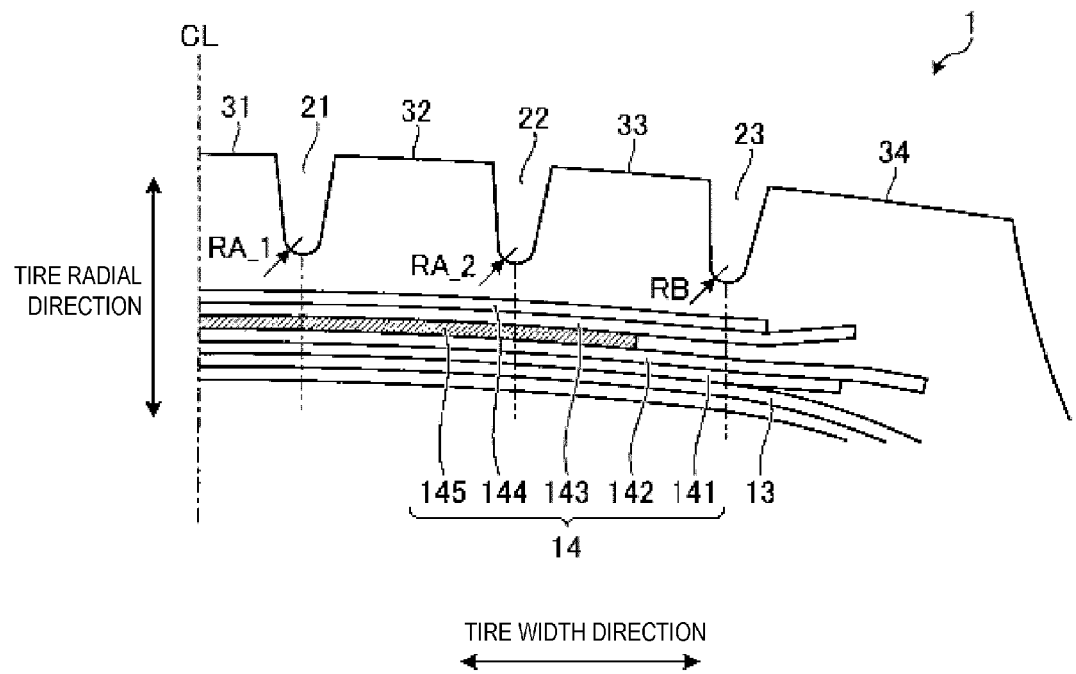
FIG. 2 is an explanatory view illustrating the belt layer of the pneumatic tire depicted in FIG. 1.
Figure 3:
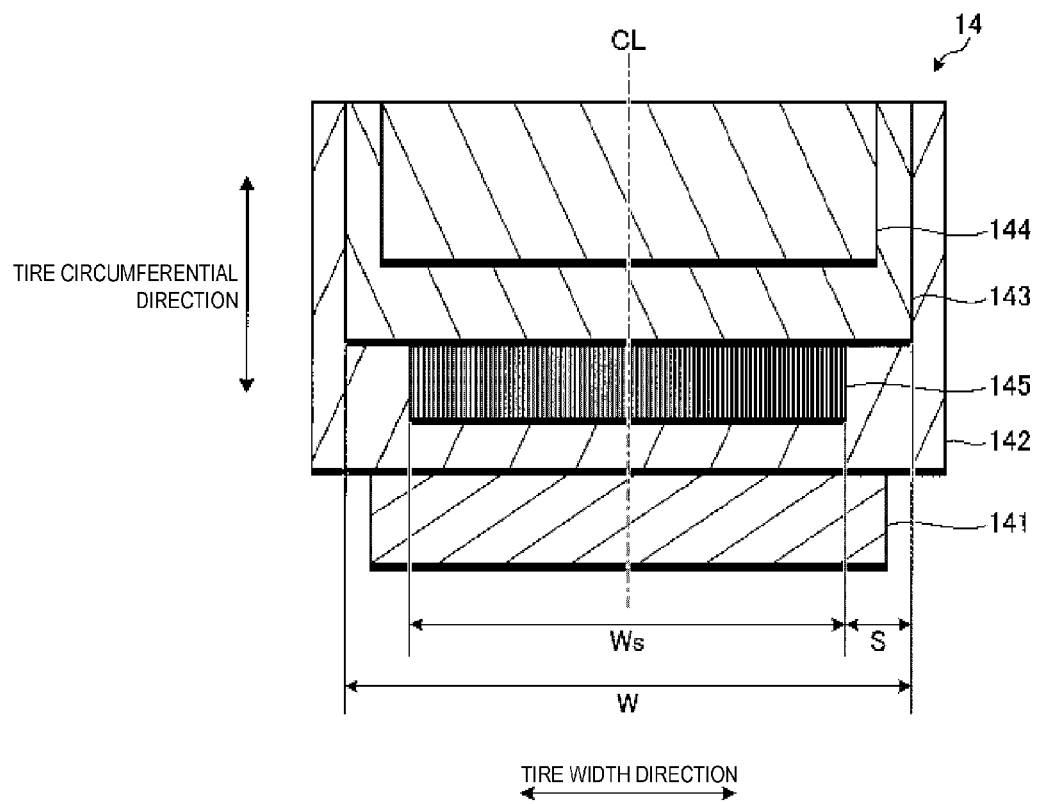
FIG. 3 is an explanatory view illustrating the belt layer of the pneumatic tire depicted in FIG. 1

FIGS. 2 and 3 are explanatory views illustrating the belt layer of the pneumatic tire depicted in FIG. 1. In these drawings, FIG. 2 illustrates the tread portion in one side region bounded by the tire equatorial plane CL, and FIG. 3 illustrates the laminated structure of the belt layer.

The belt layer 14 is formed by laminating a large angle belt 141, a pair of cross belts 142, 143, a belt cover 144, and a circumferential reinforcing layer 145, wound around the outer side of a carcass layer 13 (see FIG. 2 and FIG. 3).

The large angle belt 141 is configured by covering a plurality of belt cords formed from steel or organic fibers with a coating rubber and subjecting it to a rolling process, and has a belt angle (the angle of inclination of the direction of the fibers of the belt cords with respect to the tire circumferential direction) with an absolute value of not less than 40 deg and not more than 60 deg. Also, the large angle belt 141 is disposed laminated on the outer side in the tire radial direction of the carcass layer 13.

The pair of cross belts 142, 143 is configured by covering a plurality of belt cords formed from steel or organic fibers with a coating rubber and subjecting it to a rolling process, and has a belt angle with an absolute value of not less than 10 deg and not more than 30 deg. Further, each of the belts of the pair of cross belts 142, 143 has a belt angle denoted with a mutually different symbol, and the belts are laminated so as to intersect each other in the belt cord fiber directions (crossply configuration). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be provided laminated (not illustrated on the drawings). Also, the pair of cross belts 142, 143 is disposed laminated on the outer side in the tire radial direction with respect to the large angle belt 141.

The belt cover 144 is configured by covering a plurality of belt cords formed from steel or organic fibers with a coating rubber and subjecting it to a rolling process, and has a belt angle with an absolute value of not less than 10 deg and not more than 45 deg. Also, the belt cover 144 is disposed laminated on the outer side in the tire radial direction with respect to the cross belts 142, 143. In this embodiment, the belt cover 144 has the same belt angle as the outer-side cross belt 143, and is disposed in the outermost layer of the belt layer 14.

The circumferential reinforcing layer 145 is configured from a single steel wire wound in spiral form at an angle with respect to the tire circumferential direction within the range of ±5 deg. Also, the circumferential reinforcing layer 145 is interposed between the pair of cross belts 142, 143. Also, the circumferential reinforcing layer 145 is disposed on the inner side in the tire width direction from the left and right edges of the pair of cross belts 142, 143. Specifically, the circumferential reinforcing layer 145 is formed by winding one or a plurality of wires in a spiral manner around the outer periphery of the inner-side cross belt 142. The circumferential reinforcing layer 145 improves the tire cracking resistance by strengthening the stiffness in the tire circumferential direction.

The belt layer 14 may have an edge cover (not illustrated on the drawings). Normally, the edge cover is configured by covering a plurality of belt cords formed from steel or organic fibers with a coating rubber and subjecting it to a rolling process, and has a belt angle in the range ±5 deg. Also, the edge cover is disposed on the outer side in the tire radial direction from the left and right edges of the outer-side cross belt 143 (or the inner-side cross belt 142). The edge covers improve the uneven wear resistance performance of the tire by reducing the difference in radial growth between the center region and the shoulder region of the tread portion, by exhibiting a fastening effect.

Also, in the present embodiment, the circumferential reinforcing layer 145 is interposed between the pair of cross belts 142, 143 (see FIG. 2). However, the configuration is not limited thereto. The circumferential reinforcing layer 145 may be disposed inward in the tire radial direction or outward in the tire radial direction from the pair of cross belts 142, 143 (not illustrated on the drawings). For example, the circumferential reinforcing layer 145 may be interposed (1) between the large angle belt 141 and the inner-side cross belt 142, or (2) between the carcass layer 13 and the large angle belt 141. Also, the circumferential reinforcing layer 145 may be interposed (3) between the outer-side cross belt 143 and the belt cover 144.

Also, in the present embodiment, the circumferential reinforcing layer 145 is configured by winding a single steel wire in a spiral manner. However, the configuration is not limited thereto, and the circumferential reinforcing layer 145 may be configured from a plurality of wires wound spirally around side-by-side to each other (multiple winding structure). In this case, preferably the number of wires is 5 or less. Also, preferably the width of winding per unit when 5 wires are wound in multiple layers is 12 mm or less. In this way, a plurality (not less than 2 and not more than 5) of wires can be wound properly while inclined with respect to the tire circumferential direction in the range ±5 deg.

Curvature Radius of the Groove Bottoms

Also, the pneumatic tire 1 includes at least three or more circumferential main grooves 21 to 23 in the tread portion having groove bottoms that are convex in the groove depth direction (see FIGS. 1 and 2). The groove bottom is the bottom wall surface that is in contact with the left and right side wall surfaces of the groove.

Here, in a cross-sectional view in the tire meridian direction, of the circumferential main grooves 21 to 23, the circumferential main grooves 21, 22 that have the circumferential reinforcing layer 145 below the groove are referred to as the first circumferential main grooves, and the other circumferential main groove 23 is referred to as the second circumferential main groove (see FIG. 2). In other words, the grooves are classified as first circumferential main grooves and second circumferential main groove depending on whether they have the circumferential reinforcing layer 145 below the groove. Specifically, when imaginary lines are drawn in the tire radial direction from the groove bottoms of the circumferential main grooves, if the imaginary line passes through the circumferential reinforcing layer 145, the circumferential main groove is a first circumferential main groove, and if the imaginary line does not pass through the circumferential reinforcing layer 145, the circumferential main groove is a second circumferential main groove.

For example, in the configuration in FIGS. 1 and 2, the pneumatic tire 1 has a structure that is symmetrical left to right, and the regions to the left and right of the tire equatorial plane CL as boundary each have three circumferential main grooves 21 to 23. Also, the circumferential main grooves 21 to 23 each have a groove bottom that is convex in the groove depth direction. Also, in each region, the two circumferential main grooves 21, 22 on the inner side in the tire width direction have the circumferential reinforcing layer 145 below the grooves, so they are first circumferential main grooves. Also, the circumferential main groove 23 on the outermost side in the tire width direction is disposed on the outer side in the tire width direction from the edge of the circumferential reinforcing layer 145, so it is a second circumferential main groove. Therefore, in each of the left and right regions of the tire, there are two first circumferential main grooves 21, 22, and one second circumferential main groove 23.

Also, the curvature radius RA of a groove bottom of an arbitrary first circumferential main groove and the curvature radius RB of a groove bottom of an arbitrary second circumferential main groove have the relationship RA<RB. Therefore, the curvature radius RB of the groove bottom of all second circumferential main grooves 23 is set larger than the curvature radius RA of the groove bottom of all the other first circumferential main grooves 21, 22 having the circumferential reinforcing layer 145 below the grooves.

For example, in the configuration in FIG. 2, the curvature radii RA_1, RA_2 of the groove bottoms of the two first circumferential main grooves 21, 22 and the curvature radius RB of the one second circumferential main groove 23 have the relationships RA_1<RB and RA_2<RB. Also, of the two first circumferential main grooves 21, 22, the curvature radius RA_2 of the groove bottom of the first circumferential main groove 22 on the outer side in the tire width direction is set larger (RA_1<RA_2).

Figure 4:
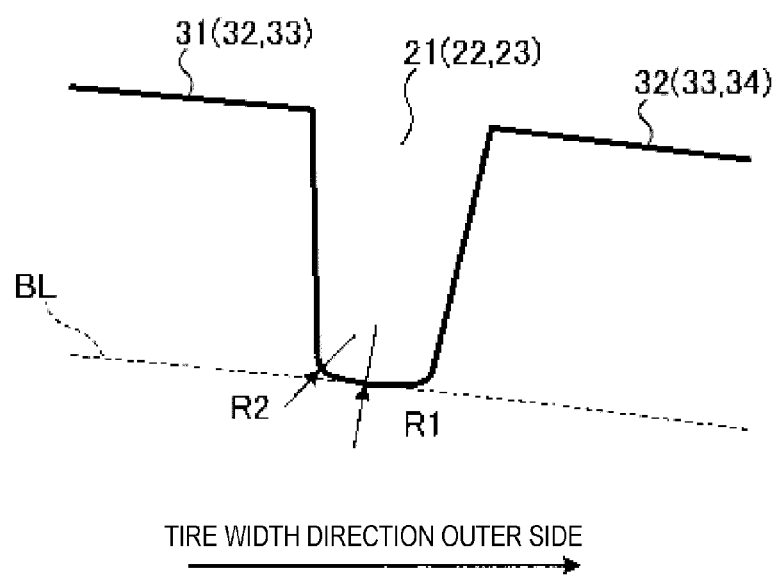
FIG. 4 is an explanatory view illustrating the curvature radii of the groove bottom of the circumferential main groove.
Figure 5:
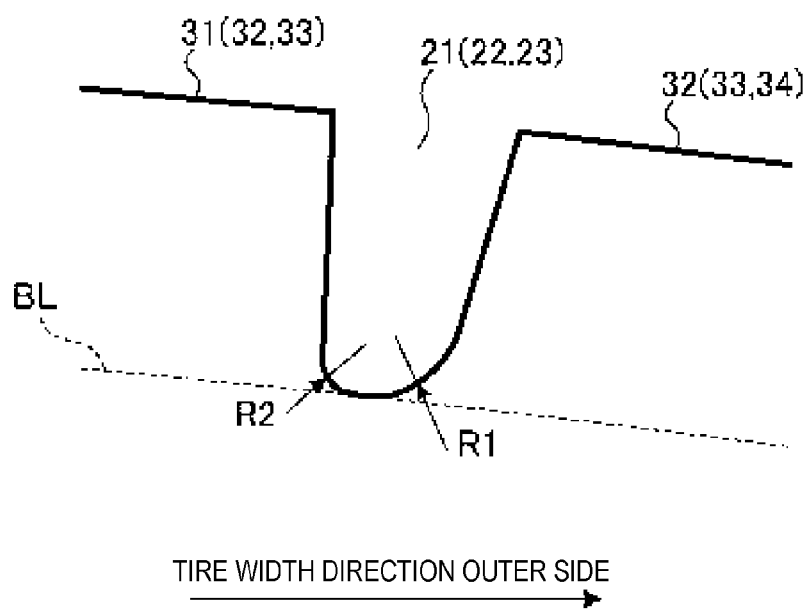
FIG. 5 is an explanatory view illustrating the curvature radii of the groove bottom of the circumferential main groove.

FIGS. 4 and 5 are explanatory views illustrating the curvature radii of the groove bottoms of the circumferential main grooves. In these drawings, the reference symbol BL indicates an imaginary line that passes through the deepest portion of the groove.

The curvature radius RA, RB of the groove bottoms is the curvature radius of a circular arc that contacts the deepest portion of the groove. For example, in a configuration in which the groove bottom includes a single circular arc, as illustrated in FIG. 2, the curvature radius of the circular arc is the curvature radius RA, RB of the groove bottom. Also, in a configuration in which the groove bottom of a single groove includes a plurality of circular arcs that contact each other, as illustrated in FIG. 4, the curvature radius R1 of the circular arc that contacts the deepest portion of the groove is the curvature radius RA, RB of the groove bottom. Also, in a configuration in which the groove bottom of a single groove is formed from a pair of left and right circular arcs that contact the deepest portion of the groove, as illustrated in FIG. 5, the curvature radius R1 of the circular arc on the outer side in the tire width direction is the curvature radius RA, RB of the groove bottom.

The curvature radius RA, RB of the groove bottom is measured when the tire is assembled on a standard rim and inflated to a regular internal pressure, under no load conditions.

Herein, "standard rim" refers to a "standard rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular internal pressure is an air pressure of 180 kPa, and the regular load is 88% of the maximum load capacity.

As described above, in the pneumatic tire 1, the belt layer 14 includes the circumferential reinforcing layer 145, so the circumferential reinforcing layer 145 exhibits a fastening effect that reduces the radial growth of the tire. As a result, uneven wear of the tire is suppressed.

On the other hand, in the regions outside the circumferential reinforcing layer 145, radial growth of the tire and straining of tread portion can easily occur, so there is the problem that groove cracking can easily occur in the groove bottoms of the circumferential main grooves.

In this respect, in the pneumatic tire 1, the curvature radius RA of the groove bottom of the first circumferential main grooves 21, 22 which have the circumferential reinforcing layer 145 below the grooves and the curvature radius RB of the groove bottom of the second circumferential main groove 23 located outside the circumferential reinforcing layer 145 have the relationship RA<RB, so it is possible to reduce the occurrence of groove cracking in the groove bottom of the second circumferential main groove 23 in the region where radial growth and straining can easily occur. As a result, the cracking resistance of the tire improves.

In the pneumatic tire 1, the curvature radius RA of the groove bottom of an arbitrary first circumferential main groove and the curvature radius RB of the groove bottom of an arbitrary second circumferential main groove preferably have the relationship 1.10≤RB/RA≤1.60. In this way, the ratio RB/RA of the curvature radius RA of the first circumferential main groove and the curvature radius RB of the second circumferential main groove are made appropriate.

Modified Examples

FIGS. 6 to 10 are explanatory views illustrating modified examples of the pneumatic tire depicted in FIG. 1. In these drawings, components that are the same as those described for the pneumatic tire depicted in FIG. 1 are assigned the same reference numerals and descriptions thereof are omitted.

Figure 6:
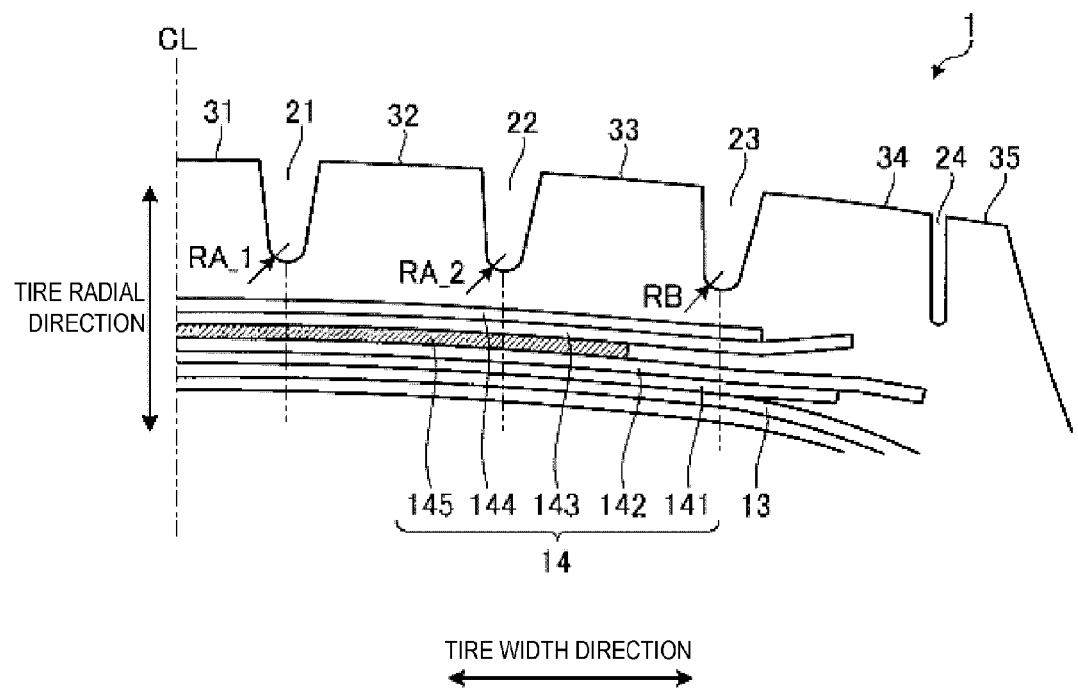
FIG. 6 is an explanatory view illustrating a modified example of the pneumatic tire depicted in FIG. 1.

In the modified example in FIG. 6, the pneumatic tire 1 in the configuration of FIG. 2 includes a circumferential narrow groove 24 formed along the edge portion on the outer side in the tire width direction of a shoulder land portion 34, and a narrow rib 35 formed by being partitioned by the circumferential narrow groove 24. The circumferential narrow groove 24 has a groove width less than 5 mm. In this configuration, the narrow rib 35 positively wears to function as a sacrifice rib, when the tire is rolling, so the uneven wear of the shoulder land portion 34 is reduced.

Here, in the modified example in FIG. 6, the groove width of the circumferential narrow groove 24 is narrow, so the circumferential narrow groove 24 is not classified as either a first circumferential main groove or a second circumferential main groove. Therefore, there is no particular limitation on the curvature radius of the groove bottom of the circumferential narrow groove 24, and the curvature radius can be set as appropriate without any relationship to the first circumferential main grooves 21, 22 and the second circumferential main groove 23.

Figure 7:
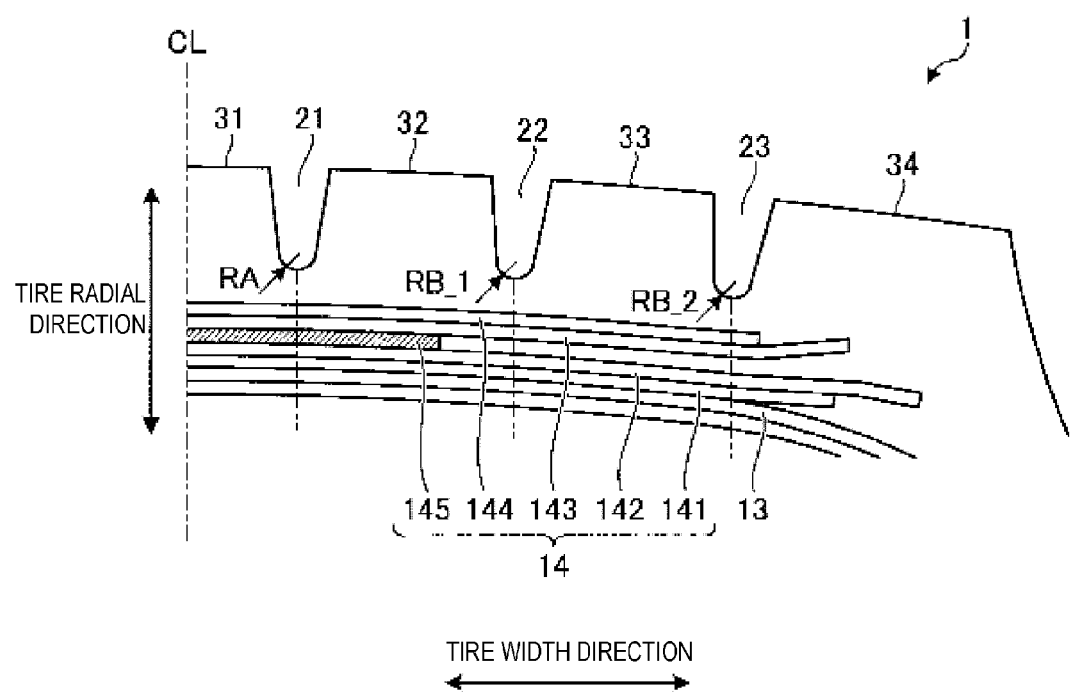
FIG. 7 is an explanatory view illustrating a modified example of the pneumatic tire depicted in FIG. 1.

The modified example of FIG. 7 has a circumferential reinforcing layer 145 whose width is narrow compared with the configuration in FIG. 2. Therefore, in the region on one side of the tire, two circumferential main grooves 22, 23 are disposed on the outer side in the tire width direction of the edge portion of the circumferential reinforcing layer 145, and are second circumferential main grooves.

Figure 8:
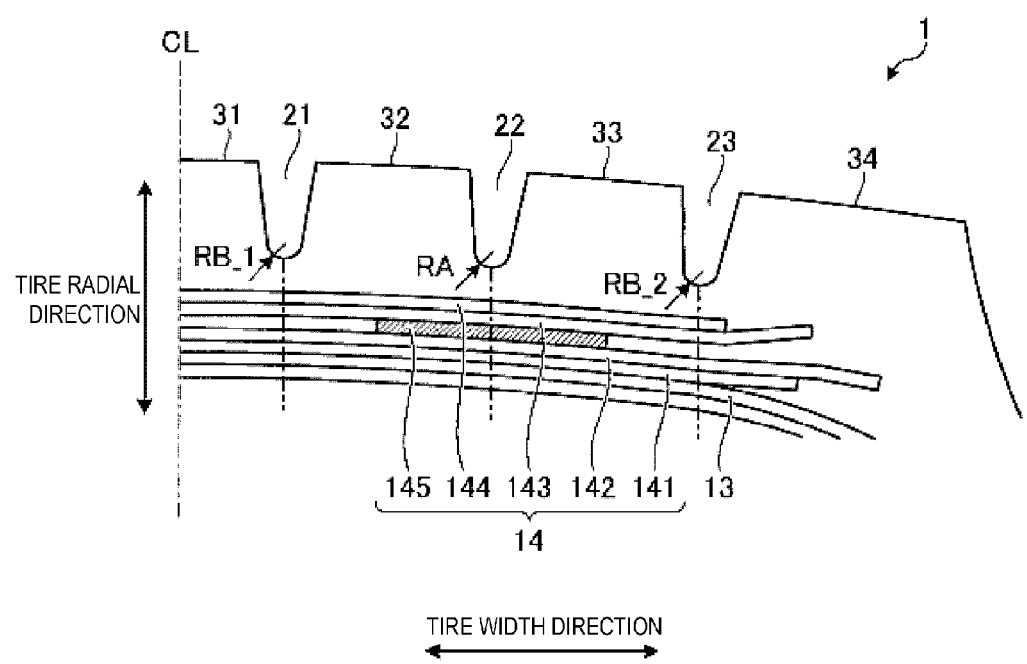
FIG. 8 is an explanatory view illustrating a modified example of the pneumatic tire depicted in FIG. 1.

Also, in the modified example in FIG. 8, the circumferential reinforcing layer 145 has a divided structure, compared with the configuration in FIG. 2. Specifically, a pair of circumferential reinforcing layers 145 is disposed symmetrically left to right about the tire equatorial plane CL as center and separated from each other. Also, in the region on one side of the tire, the circumferential reinforcing layer 145 is disposed below only the central circumferential main groove 22 of the three circumferential main grooves 21 to 23. Therefore, the central circumferential main groove 22 is a first circumferential main groove, and the circumferential main groove 21 closest to the tire equatorial plane CL and the circumferential main groove 23 furthest to the outer side in the tire width direction are second circumferential main grooves.

In the modified example of FIG. 7 (FIG. 8), the curvature radii $RA\_1$, $RA\_2$ of the groove bottoms of both second circumferential main grooves 22, 23 (21, 23) and the curvature radius RA of the groove bottom of the first circumferential main groove 21 (22) are set so that RA<$RA\_1$ and RA<$RA\_2$. In this way, groove cracking in each of the second circumferential main grooves 22, 23 (21, 23) is reduced.

In the modified examples in FIGS. 7 and 8, even if there are three or more second circumferential main grooves, the curvature radius RB of the groove bottoms of all the second circumferential main grooves is set so that it has the relationship RA<RB with respect to the curvature radius RA of the groove bottom of the first circumferential main groove.

Likewise, when there is a plurality of first circumferential main grooves and a plurality of second circumferential main grooves, the curvature radius RA of the groove bottom of an arbitrary first circumferential main groove and the curvature radius RB of the groove bottom of an arbitrary second circumferential main groove are set to have the relationship RA<RB.

Also, in the modified example in FIG. 7 (FIG. 8), both second circumferential main grooves 22, 23 (21, 23) are set so that the curvature radius $RB\_2$ of the groove bottom of the second circumferential main groove 23 on the outermost side in the tire width direction and the curvature radius $RA\_1$ of the groove bottom of the other second circumferential main groove 22 (21) have the relationship $RA\_<RB\_2$. In this way, it is possible to reduce the occurrence of groove cracking in the groove bottom of the second circumferential main groove 23 in the outer side of the region where radial growth and straining can more easily occur.

Figure 9:
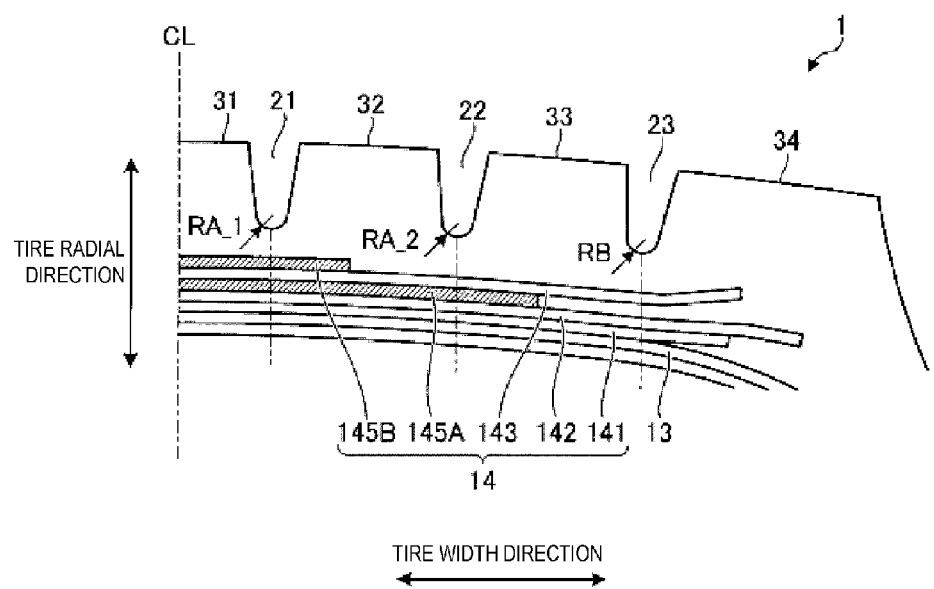
FIG. 9 is an explanatory view illustrating a modified example of the pneumatic tire depicted in FIG. 1.

In the modified example in FIG. 9, compared with the configuration in FIG. 2, the pneumatic tire 1 includes a second circumferential reinforcing layer instead of the belt cover 144. Here, a circumferential reinforcing layer 145A interposed between the pair of cross belts 142, 143 is referred to as a first circumferential reinforcing layer, and a circumferential reinforcing layer 145B disposed on the outermost layer of the belt layer 14 is referred to as a second circumferential reinforcing layer. These circumferential reinforcing layers 145A, 145B have the same structure as the circumferential reinforcing layer 145 in FIG. 2. Also, the first circumferential reinforcing layer 145A is disposed in the same position as the circumferential reinforcing layer 145 of FIG. 2. Also, the second circumferential reinforcing layer 145B has a structure with a narrower width than the first circumferential reinforcing layer 145A, and is disposed wrapped around the first circumferential reinforcing layer 145A. Also, the second circumferential reinforcing layer 145B is disposed below only the circumferential main groove 21 closest to the tire equatorial plane CL. Therefore, of the three circumferential main grooves 21 to 23, the two circumferential main grooves 21, 22 on the tire equatorial plane CL side are first circumferential main grooves, and the circumferential main groove 23 on the outer side in the tire width direction is a second circumferential main groove. Also, two circumferential reinforcing layers 145A, 145B are disposed below the circumferential main groove 21 closest to the tire equatorial plane CL, and only one circumferential reinforcing layer 145A is disposed below the central circumferential main groove 22.

Figure 10:
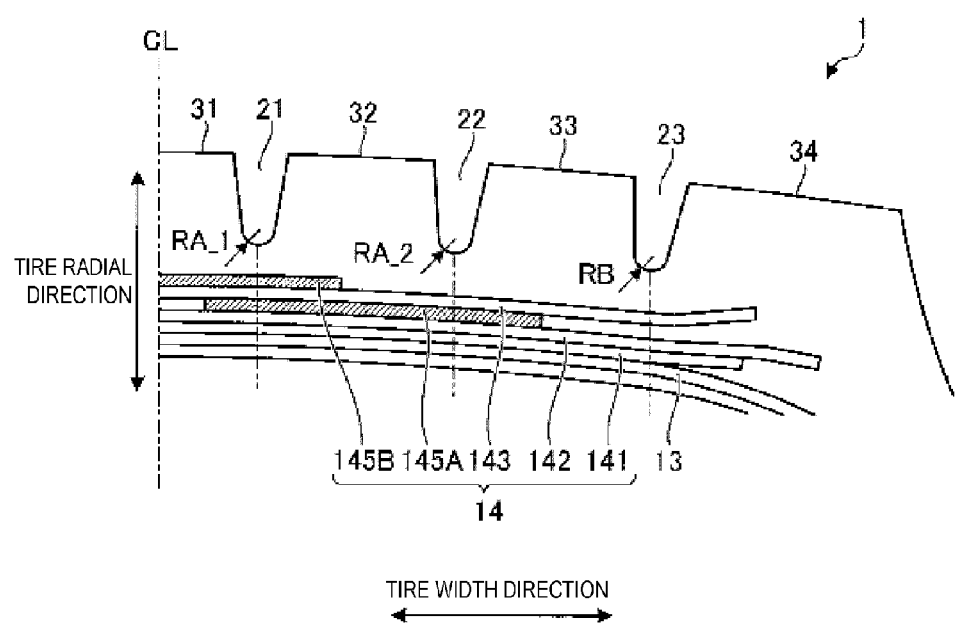
FIG. 10 is an explanatory view illustrating a modified example of the pneumatic tire depicted in FIG. 1.

In the modified example in FIG. 10, the circumferential reinforcing layer 145A in the modified example of FIG. 9 has a divided structure in the tire width direction. However, the classification into first circumferential main grooves and second circumferential main grooves, and the number of circumferential reinforcing layers below the first circumferential main grooves is the same as the modified example in FIG. 9.

In the modified examples in FIGS. 9 and 10, with respect to the curvature radii $RA\_1$, $RA\_2$ of the groove bottoms of the first circumferential main grooves 21, 22, the curvature radius RB of the groove bottom of the second circumferential main groove 23 is set so that they have the relationships $RA\_1<RB$ and $RA\_2<RB$. In this way, the occurrence of groove cracking in the second circumferential main groove 23 is reduced.

Also, in the modified examples in FIGS. 9 and 10, the curvature radius $RA\_1$ of the groove bottom of the first circumferential main groove 21 that has both the first circumferential reinforcing layer 145A and the second circumferential reinforcing layer 145B below the groove, and the curvature radius RA_2 of the groove bottom of the first circumferential main groove 22 having only the first circumferential reinforcing layer 145A below the groove are set so that they have the relationship RA_2<RA_1. In this configuration, of the plurality of first circumferential main grooves 21, 22, the first circumferential main groove 22 with fewer circumferential reinforcing layer is set with a larger curvature radius RA_2 of the groove bottom. In this way, the occurrence of groove cracking is effectively reduced.

In addition, the belt layer 14 may have three or more circumferential reinforcing layers 145 laminated onto each other (not illustrated on the drawings). In this case, as in the modified examples in FIGS. 9 and 10, of all the first circumferential main grooves, the curvature radius RA_min of the groove bottom of the first circumferential main groove having the fewest number of circumferential reinforcing layers 145 below the groove and the curvature radius RA of the groove bottom of the other first circumferential main grooves are set so that they have the relationship RA<RA_min. In this way, the occurrence of groove cracking is effectively reduced.

Additional Data

In the pneumatic tire 1, preferably the circumferential reinforcing layer 145 is disposed on the inner side in the tire width direction from the left and right edge portions of the cross belt 143 with the narrower width of the pair of cross belts 142, 143 (see FIG. 3). Also, preferably the width W of the cross belt 143 with the narrower width and the distance S from the edge portion of the circumferential reinforcing layer 145 to the edge portion of the cross belt 143 with the narrower width are in the range 0.03≤S/W. This point is the same even if the circumferential reinforcing layer 145 has a configuration with a divided structure (see FIGS. 8 and 10).

For example, in the present embodiment, the outer-side cross belt 143 has a structure with a narrow width, and the circumferential reinforcing layer 145 is disposed on the inner side in the tire width direction from the left and right edge portions of the outer-side cross belt 143. Also, the outer-side cross belt 143 and the circumferential reinforcing layer 145 are disposed symmetrically on the left and right about the tire equatorial plane CL as center. Also, in a region on one side bounded by the tire equatorial plane CL, the positional relationship S/W of the edge portion of the outer-side cross belt 143 and the edge portion of the circumferential reinforcing layer 145 is made appropriate within the range as described above.

In this constitution, the positional relationship S/W of the edge portions of the cross belts 142, 143 and the edge portions of the circumferential reinforcing layer 145 is made appropriate, and it is possible to reduce the strain that is produced in the rubber material around the circumferential reinforcing layer 145.

The width W and the distance S are measured as distances in the tire width direction in the cross-sectional view of the tire meridian direction. Also, there is no upper limit to the value of S/W in particular, but it is restricted by the relationship of the width Ws of the circumferential reinforcing layer 145 and the width W of the cross belt 143 with a narrow width.

Also, the width Ws of the circumferential reinforcing layer 145 is set to 0.60≤Ws/W. When the circumferential reinforcing layer 145 has a divided structure (see FIGS. 8 and 10), the width Ws of the circumferential reinforcing layer 145 is the sum of the widths of each divided portion.

Also, in the pneumatic tire 1, the wire from which the circumferential reinforcing layer 145 is configured is steel wire, and preferably the numbers of ends of the circumferential reinforcing layer 145 is not less than 17 [ends/50 mm] and not more than 30 [ends/50 mm]. Also, preferably the wire diameter is in the range not less than 1.2 mm and not more than 2.2 mm. In a configuration in which the wire is formed from a plurality of wire cords twisted together, the wire diameter is measured as the diameter of a circle that circumscribes the wire.

Effect

As explained above, the pneumatic tire 1 includes the belt layer 14 that includes the circumferential reinforcing layer 145 and the pair of cross belts 142, 143 (see FIGS. 1 to 3). Also, the pneumatic tire 1 includes at least three or more circumferential main grooves 21 to 23 in the tread portion having groove bottoms that are convex in the groove depth direction (see FIG. 2). Also, the curvature radius RA of the groove bottom of an arbitrary first circumferential main groove 21, 22 and the curvature radius RB of the groove bottom of an arbitrary second circumferential main groove 23 have the relationship RA<RB.

In this configuration, the curvature radius RA of the groove bottom of the first circumferential main grooves 21, 22 which have the circumferential reinforcing layer 145 below the grooves and the curvature radius RB of the groove bottom of the second circumferential main groove 23 located on the outside from the circumferential reinforcing layer 145 have the relationship RA<RB. Therefore, it is possible to reduce the occurrence of groove cracking in the groove bottom of the second circumferential main groove 23 in the region where radial growth and straining can easily occur. The improvement leads to the advantage that the cracking resistance of the tire improves.

Also, in the pneumatic tire 1, the curvature radius RA of the groove bottom of an arbitrary first circumferential main groove 21, 22 and the curvature radius RB of the groove bottom of an arbitrary second circumferential main groove 23 have the relationship 1.10≤RB/RA≤1.60. In this way, the ratio (RB/RA) of the curvature radius RA of the first circumferential main grooves to the curvature radius RB of the second circumferential main groove is made appropriate, which has the advantage that it is possible to effectively reduce the occurrence of groove cracking in the second circumferential main groove 23.

Also, in the pneumatic tire 1, when there is a plurality of second circumferential main grooves 22, 23 (21, 23) in a region bounded by the tire equatorial plane CL, the curvature radius RB_out (=RA_2) of the groove bottom of the second circumferential main groove 23 that is in the outermost side in the tire width direction and the curvature radius RB (=RA_1) of the groove bottom of the other second circumferential main grooves have the relationship RB<RB_out (see FIGS. 7 and 8). In this way, there is the advantage that it is possible to reduce the occurrence of groove cracking in the groove bottom of the second circumferential main groove 23 in the outer side of the region where radial growth and straining can more easily occur.

Also, in the pneumatic tire 1, when the belt layer 14 has a plurality of circumferential reinforcing layers 145A, 145B laminated on each other, and when there is a plurality of first circumferential main grooves 21, 22 in a region bounded by the tire equatorial plane CL, and at least one of the first circumferential main grooves 21 has the plurality of circumferential reinforcing layers 145A, 145B below the groove, the curvature radius RA_min (=RA_2) of the groove bottom of the first circumferential main groove having the smallest number of circumferential reinforcing layers (one circumferential reinforcing layer) from among all the first circumferential main grooves 21, 22 and the curvature radius RA (=RA_1) of the groove bottom of the other first circumferential main grooves 21 have the relationship RA<RA_min (see FIGS. 9 and 10). In this configuration, of the plurality of first circumferential main grooves 21, 22, the first circumferential main groove 22 with fewer circumferential reinforcing layers is set with a larger curvature radius RA_min of the groove bottom. In this way, there is the advantage that the occurrence of groove cracking is effectively reduced.

Also, in the pneumatic tire 1, the circumferential reinforcing layer 145 is disposed on the inner side in the tire width direction from the left and right edge portions of the cross belt 143 with the narrower width of the pair of cross belts 142, 143 (see FIG. 3). Also, the width W of the cross belt 143 with the narrower width and the distance S from the edge portion of the circumferential reinforcing layer 145 to the edge portion of the cross belt 143 with the narrower width are in the range 0.03≤S/W. In this configuration, the positional relationship S/W of the edge portions of the cross belts 142, 143 and the edge portions of the circumferential reinforcing layer 145 is made appropriate, and this has the advantage that it is possible to reduce the strain that is produced in the rubber material around the circumferential reinforcing layer 145.

Also, in the pneumatic tire 1, the wire from which the circumferential reinforcing layer 145 is configured is steel wire, and the numbers of ends of the circumferential reinforcing layer 145 is not less than 17 [ends/50 mm] and not more than 30 [ends/50 mm]. In this way, the structural strength of the circumferential reinforcing layer 145 is properly ensured.

Also, in the pneumatic tire 1, the diameter of the wire that constitutes the circumferential reinforcing layer 145 is in the range not less than 1.2 mm and not more than 2.2 mm. In this way, the structural strength of the circumferential reinforcing layer 145 is properly ensured.

Also, in the pneumatic tire 1, the elongation of the belt cords 1451 of the circumferential reinforcing layer 145 when subjected to a tensile load of 150 N to 200 N is preferably not less than 2.0 [%] and not more than 3.5 [%]. The belt cords 1451 (high elongation steel wire) have better elongation when a low load is applied compared with normal steel wire, so they can withstand the loads that are applied to the circumferential reinforcing layer 145 during the time from manufacture until it is used, so it is possible to minimize damage to the circumferential reinforcing layer 145, which is desirable.

The elongation of the belt cords is measured in accordance with JIS G 3510.

Application Example

Also, in the pneumatic tire 1, in the state where the tire is fitted to a standard rim, the standard internal pressure is applied to the tire, and the standard load is applied, preferably the aspect ratio HW is within the range 40 [%]≤HW≤70 [%]. In addition, the pneumatic tire 1 as in the present embodiment is preferably used as a pneumatic tire for heavy loads, such as buses or trucks and the like. With tires having this aspect ratio HW, in particular pneumatic tires for heavy loads such as buses and trucks and the like, the ground contact shape can easily become hourglass-shaped, and the occurrence of groove cracking is significant. Therefore, by applying the configuration of the pneumatic tire 1 to a tire having this aspect ratio HW, it is possible to obtain a more significant groove cracking reduction effect.

EXAMPLES

FIGS. 11a-11b include a table showing the results of performance testing of pneumatic tires according to the embodiments of the present technology.

In the performance testing, a plurality of mutually differing pneumatic tires were evaluated for cracking resistance performance (see FIGS. 11a-11b). Also, pneumatic tires of tire size 445/50R22.5 were fitted to a "design rim" as prescribed by TRA, and 80 [%] of the air pressure in "Tire Load Limits at Various Cold Inflation Pressures" as prescribed by TRA, and the maximum value of "Tire Load Limits at Various Cold Inflation Pressures" were applied. Also, after a test vehicle to which the pneumatic tires were fitted had traveled 100,000 [km] on a normal paved road, the number of occurrences of cracking of length 3 mm or longer in the groove bottom of the circumferential main grooves was counted. The fewer the number of cracks that occurred the better, and if the number is 3 or less, it is considered to be beneficial.

The pneumatic tires 1 according to working examples 1 to 13 had the configuration of one of FIG. 2 or FIGS. 7 to 10, with the curvature radius RA of the groove bottom of the first circumferential main grooves 21, 22 and the curvature radius RB of the groove bottom of the second circumferential main groove 23 made appropriate. Also, the positional relationship S/W of the edge portion of the outer-side cross belt 143 and the edge portion of the circumferential reinforcing layer 145 was set to S/W=0.1.

In the conventional example of pneumatic tire, the curvature radii RA_1, RA_2 of the groove bottom of the first circumferential main grooves 21, 22 in FIG. 2 were equal.

As is clear from the test results, with the pneumatic tires of Working Examples 1 to 13, compared with the pneumatic tire of the Conventional Example, the cracking resistance of the tires were enhanced.

What is claimed is:

1. A pneumatic tire that includes a belt layer having a circumferential reinforcing layer and a pair of cross belts, comprising:
   at least three or more circumferential main grooves having groove bottoms that are convex in the depth direction in a tread portion, wherein
   in a cross-sectional view in the tire meridian direction, of the circumferential main grooves, a circumferential main groove having the circumferential reinforcing layer below the groove is a first circumferential main groove, and another circumferential main groove is a second circumferential main groove not having the circumferential reinforcing layer below the groove, and
   the curvature radius RA of the groove bottom of an arbitrary first circumferential main groove and the curvature radius RB of the groove bottom of an arbitrary second circumferential main groove have the relationship RA<RB.

2. The pneumatic tire according to claim 1, wherein the curvature radius RA of the groove bottom of an arbitrary first circumferential main groove and the curvature radius RB of the groove bottom of an arbitrary second circumferential main groove have the relationship 1.10≤RB/RA≤1.60.

3. The pneumatic tire according to claim 1, wherein there is a plurality of second circumferential main grooves in a region bounded by the tire equatorial plane, and the curvature radius RB_out of the groove bottom of the second circumferential main groove that is in the outermost side in the tire width direction and the curvature radius RB of the groove bottom of the other second circumferential main grooves have the relationship RB<RB_out.

4. The pneumatic tire according to claim 1, wherein the belt layer has a plurality of circumferential reinforcing layers laminated on each other, and there is a plurality of first circumferential main grooves in a region bounded by the tire equatorial plane, and at least one of the first circumferential main grooves has the plurality of circumferential reinforcing layers below the groove, and the curvature radius RA_min of the groove bottom of the first circumferential main groove having the smallest number of circumferential reinforcing layers from among all the first circumferential main grooves and the curvature radius RA of the groove bottom of the other first circumferential main grooves have the relationship RA<RA_min.

5. The pneumatic tire according to claim 1, wherein the circumferential reinforcing layer is disposed on the inner side in the tire width direction from the left and right edge portions of the cross belt with the narrower width from among the pair of cross belts, and the width W of the narrower cross belt and the distance S from the edge portion of the circumferential reinforcing layer to the edge portion of the narrower cross belt are within the range 0.03≤S/W.

6. The pneumatic tire according to claim 1, wherein wire from which the circumferential reinforcing layer is made is steel wire, and the circumferential reinforcing layer has not fewer than 17 ends/50 mm and not more than 30 ends/50 mm ends.

7. The pneumatic tire according to claim 1, wherein the diameter of the wire not less than 1.2 mm and not more than 2.2 mm.

8. The pneumatic tire according claim 1, wherein the circumferential reinforcing layer is formed by winding a single steel wire in a spiral manner.

9. The pneumatic tire according to claim 1, wherein the circumferential reinforcing layer is formed by winding a plurality of wires spirally adjacent to one another.

10. The pneumatic tire according to claim 9, wherein the plurality of wires includes five or fewer wires.

11. The pneumatic tire according to claim 10, wherein a width of winding per layer of the wires when the wires are would in multiple layers is 12 mm or less.

12. The pneumatic tire according to claim 9, wherein the plurality of wires are would while inclined with respect to the tire circumferential direction in the range of ±5 degrees.

13. The pneumatic tire according to claim 9, wherein a wire diameter is in the range of not less than 1.2 mm and not more than 2.2 mm.

14. The pneumatic tire according to claim 13, wherein the wire diameter is measured as a diameter of a circle circumscribing the plurality of wires.

15. The pneumatic tire according to claim 1, wherein elongation of belt cords of the circumferential reinforcing layer when subjected to a tensile load of 150 N to 200 N is not less than 2.0% and not more than 3.5%.

16. The pneumatic tire according to claim 1, wherein:
the curvature radius RA of the groove bottom of an arbitrary first circumferential main groove and the curvature radius RB of the groove bottom of an arbitrary second circumferential main groove have the relationship 1.10≤RB/RA≤1.60; and
there is a plurality of second circumferential main grooves in a region bounded by the tire equatorial plane, and the curvature radius RB_out of the groove bottom of the second circumferential main groove that is in the outermost side in the tire width direction and the curvature radius RB of the groove bottom of the other second circumferential main grooves have the relationship RB<RB_out.

17. The pneumatic tire according to claim 1, wherein:
the belt layer has a plurality of circumferential reinforcing layers laminated on each other, and there is a plurality of first circumferential main grooves in a region bounded by the tire equatorial plane, and at least one of the first circumferential main grooves has the plurality of circumferential reinforcing layers below the groove, and the curvature radius RA_min of the groove bottom of the first circumferential main groove having the smallest number of circumferential reinforcing layers from among all the first circumferential main grooves and the curvature radius RA of the groove bottom of the other first circumferential main grooves have the relationship RA<RA_min; and
the circumferential reinforcing layer is disposed on the inner side in the tire width direction from the left and right edge portions of the cross belt with the narrower width from among the pair of cross belts, and the width W of the narrower cross belt and the distance S from the edge portion of the circumferential reinforcing layer to the edge portion of the narrower cross belt are within the range 0.03≤S/W.

18. The pneumatic tire according to claim 1, wherein:
wire from which the circumferential reinforcing layer is made is steel wire, and the circumferential reinforcing layer has not fewer than 17 ends/50 mm and not more than 30 ends/50 mm ends; and
the diameter of the wire not less than 1.2 mm and not more than 2.2 mm.

* * * * *